United States Patent [19]
Manzke, Jr.

[11] Patent Number: 4,731,012
[45] Date of Patent: Mar. 15, 1988

[54] ROTARY VACUUM BLOW-MOLDING MACHINE

[75] Inventor: George W. Manzke, Jr., Mystic, Conn.

[73] Assignee: Eagle-Picher Industries, Inc., Cincinnati, Ohio

[21] Appl. No.: 926,115

[22] Filed: Nov. 3, 1986

[51] Int. Cl.⁴ .................... B29C 51/10; B29C 51/36
[52] U.S. Cl. .................... 425/540; 425/388; 425/405.1
[58] Field of Search ............ 425/237, 405 R, 540, 425/388; 264/549, 550, 551

[56] References Cited

U.S. PATENT DOCUMENTS

| | | | |
|---|---|---|---|
| 2,943,354 | 7/1960 | Gora | 264/153 |
| 3,008,181 | 11/1961 | Fitz et al. | 264/297.6 |
| 3,079,633 | 3/1963 | Fitz | 425/394 |
| 3,280,431 | 10/1966 | Fitz | 425/90 |
| 3,640,666 | 2/1972 | Jope et al. | 264/553 |
| 3,651,190 | 3/1972 | Fitz | 264/153 |
| 4,605,368 | 8/1986 | Helmer et al. | 425/540 |

FOREIGN PATENT DOCUMENTS

0046870 12/1978 Japan ................ 425/405 R

*Primary Examiner*—Willard E. Hoag
*Attorney, Agent, or Firm*—Wood, Herron & Evans

[57] ABSTRACT

A continuous molding machine comprises a rotatable wheel that carries a plurality of fixed dies, each of which is aligned with an axially movable die within a peripheral surface to form pairs of molding dies. A strip of uncured material is movable between each pair of molding dies at a molding station. As the wheel rotates each pair of molding dies through a molding station, the molding dies are closed upon the uncured material to form a molded article. A shoe is fixedly-mounted adjacent the molding station and is slidable with respect to the peripheral surface of the rotating wheel to communicate with passages which lead from the peripheral surface of the rotating wheel to the insides of the molding dies. During die closing, vacuum is applied to the shoe to remove air from the molding dies.

3 Claims, 5 Drawing Figures

FIG. I

ROTARY VACUUM BLOW-MOLDING MACHINE

BACKGROUND OF THE INVENTION

This invention relates to a molding machine and more particularly to a machine for continuously molding articles from a strip of plastic compound such as rubber.

This invention is an improvement over machines of the type disclosed in U.S. Pat. Nos. 3,079,633 and 3,280,431. These machines include a large rotatable wheel that carries fixed and axially movable dies uniformly spaced about its periphery. At a molding station, a strip of uncured material is fed between the dies which then close upon the strip to bite off a piece from the strip and mold it to the desired shape. The wheel is heated and in turn the dies are heated from the heat in the wheels to cure the molded articles during the rotation of the wheel through the major part of a revolution.

At the end of the excursion of the part through the curing process, the dies are opened, and the cured part is ejected. It is known to apply a blast of air to the dies as the part is ejected to assist in the ejection and to clear the die of unused compound. The air is applied through a passage that extends from the die to the peripheral surface of the wheel. Compressed air is delivered to that passage by a nozzle past which the peripheral surface slides as the wheel rotates.

Although this type of molding machine has proved to be successful, the occurrence of trapped air within the mold cavity during closing of the dies has resulted in detrimental effects on part quality. Air pockets can cause visual or functional defects in the molded article because the uncured material will set and cure to a permanent shape within the mold cavity shortly after the dies close. Trapped air within the closed mold cavity can force the uncured material to take a shape other than that defined by the inside dimensions of the mold cavity.

Occasionally, the mold cavities are "burped" of this excess air by providing for a quick opening and closing of the closed dies shortly after the dies have closed on the molding compound. This practice has not completely solved the problem of trapped air. Further, the reopening and closing of the dies, once closed on the molding compound, may cause a distortion of the part.

The occurrence of visual and functional defects due to trapped air requires intensive inspection of the finished molded articles. A percentage of these finished molded articles may be rejected and scrapped due to these visual or functional defects.

The shape of the articles molded in these continuous molding machines has also been limited to rather shallow die structure. Because the dies close in an axial direction, the dimension of any molded article in the axial direction is necessarily limited to the distance that the uncured material will flow axially to fill the mold. This maximum axial dimension of molded articles is currently about 1¼".

The thickness of the strip of uncured material from which the articles are molded generally ranges from ¼ inch to ½ inch and therefore some flow in an axial direction is required to fill the mold cavity for all molded articles having an axial dimension greater than ½". The greater the depth of the mold cavity, the greater the axial flow required thereby increasing the occurrence of trapped air. This increase in trapped air leads to an undesired increase in visual and functional defects.

It is an object of this invention to provide for mass production of molded articles with a reduced rate of rejected parts, thereby alleviating the need for intensive inspection of finished molded articles after the molding process.

It is another object of this invention to provide continuous molding apparatus that permits an increase in the axial dimension of the molded article.

It is yet another object of this invention to provide an apparatus for mass production of molded articles which does not require "burping" of the mold cavity to release trapped air.

BRIEF SUMMARY OF THE INVENTION

To achieve these ends, the invention provides a method and apparatus for evacuating the mold cavity of air during the period of the closing of the dies on the uncured material to form the mold cavity and to shape the article.

More specifically, at least one of the dies of each pair of dies is provided with a passage leading to the peripheral surface of the rotatable wheel. A shoe having an arcuate chamber is fixedly-mounted in the path of those passages and adjacent the molding station where each pair of dies closes upon the uncured material to form a molded article with a shape defined by the mold cavity. This shoe is slidable with respect to the peripheral surface of the rotatable wheel and communicates with the passages during rotation. Upon the closing of each pair of dies at the molding station, vacuum is applied to the shoe to remove air from the mold cavity while the molded article is formed.

In a preferred embodiment of this invention, both dies are evacuated at the molding station during die closing by providing passages to all dies and sliding shoes connected to vacuum pumps to evacuate both sets of dies.

DETAILED DESCRIPTION OF THE DRAWINGS

The general organization and operation for molding machines of the type disclosed in U.S. Pat. Nos. 3,079,633 and 3,280,431 is as follows.

Figure 1:
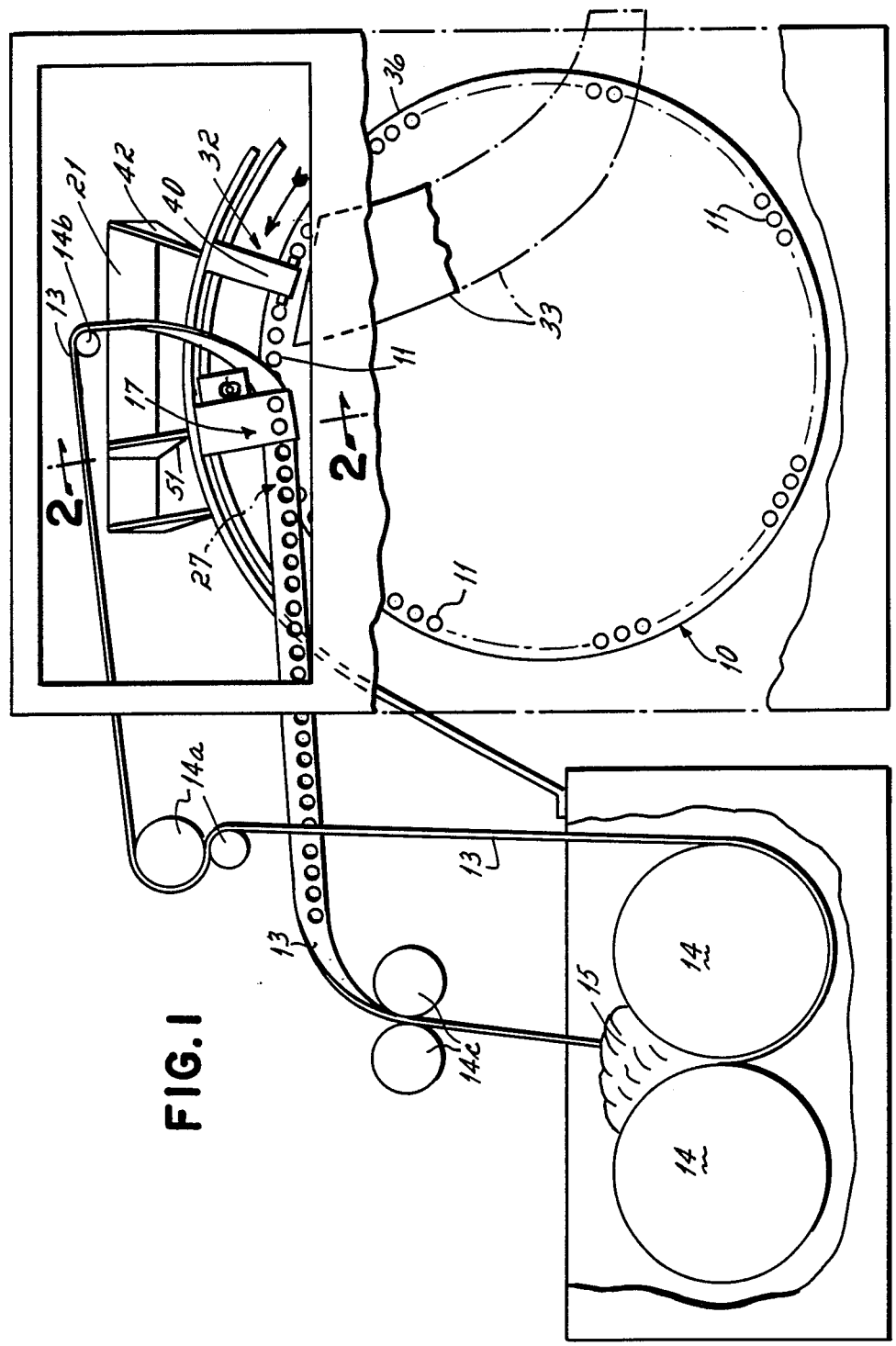
FIG. 1 is a diagrammatic side view of a molding machine of the type disclosed in U.S. Pat. Nos. 3,079,633 and 3,280,431.
Figure 2:
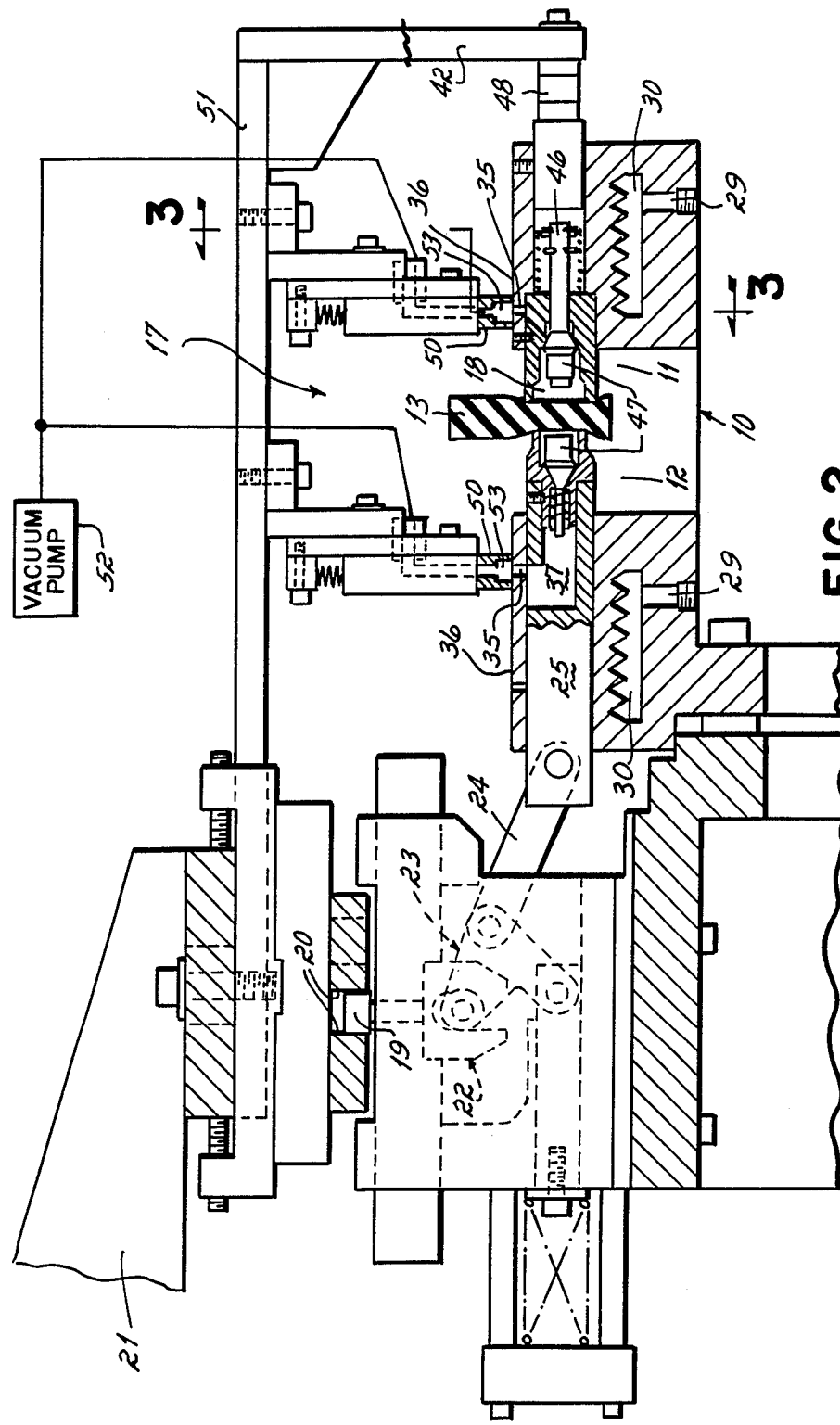
FIG. 2 is a cross sectional view taken along line 2—2 of FIG. 1 showing a pair of dies after contacting the strip of uncured material.

As shown in FIGS. 1 and 2, a molding machine for continuously molding articles from a strip of uncured material such as rubber includes a rotatable wheel 10 of approximately four feet in diameter. This rotatable wheel 10 carries approximately one hundred fixed dies 11 and an equal number of axially movable dies 12 uniformly spaced about its periphery. Each movable die 12 is aligned with a fixed die 11 to form a pair of molding dies.

As this wheel 10 rotates at a constant velocity of between 0.5 to 2.0 revolutions per minute in a counter-clockwise direction, the dies close upon a continuous strip of uncured material 13 to blank out enough material to form a part. As shown in FIG. 1, rollers 14 form and direct the continuous strip of uncured material 13 from a moldable supply 15 to the rotatable wheel 10 via rollers 14a and 14b to pass through a molding station 17 where blanking takes place. After blanking, the remainder of the strip of uncured material 13 is directed back to the moldable supply 15 via rollers 14c.

Figure 4:
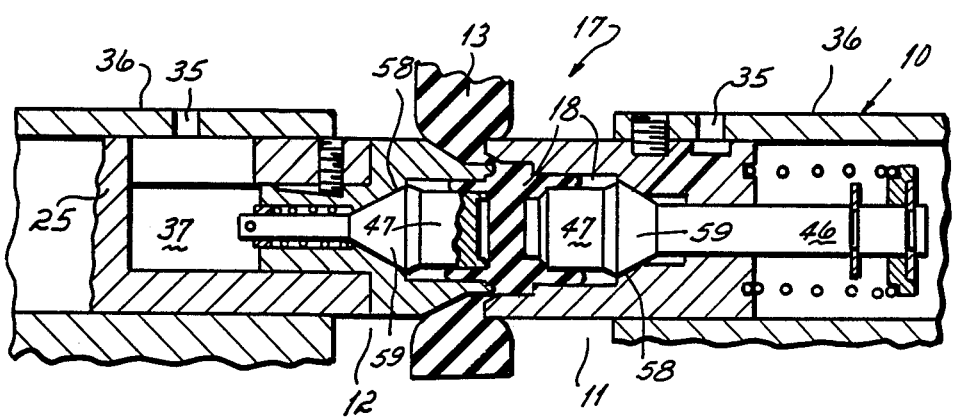
FIG. 4 is an enlarged cross section similar to a fragment of FIG. 2 showing a molded article partially formed.
Figure 5:
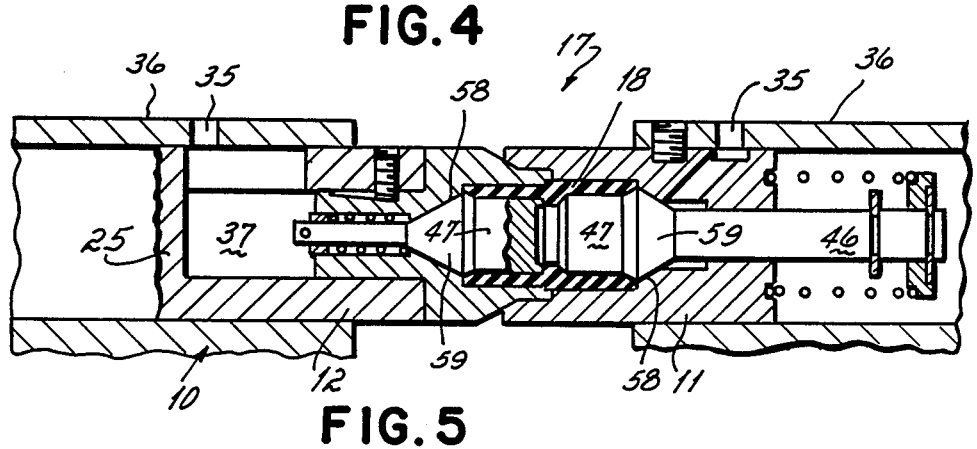
FIG. 5 is a cross section similar to FIG. 4 showing a molded article completely formed within a mold cavity.

Analogizing to the position of an hour hand on the face of a clock, the molding station 17 is located near the 11:30 position. During the closing movement, the movable die 12 closes upon the strip of uncured material 13 which has a thickness between ¼ and ½ inch, to bite off that portion that will form the molded article. The closing of the dies forms a mold cavity 18 into which the portion of uncured material flows as shown in FIGS. 2, 4 and 5.

Closing of the dies is accomplished as the wheel 10 rotates through the molding station 17. As shown in FIG. 2, a cam follower 19 associated with each movable die 12 engages a cam track 20 provided on a mounting bracket 21. The mounting bracket 21 is supported by a column which extends vertically from the base of the molding machine. The cam follower 19 carries a yoke 22 connected thereto in an axial direction toward the fixed die 11 to pivotally carry a spring loaded crank lever 23. The spring loaded crank lever 23 acts upon a pivotally connected link 24 which is pivotally connected to drive a plunger 25 to provide a toggle action in the opening and closing of the dies. The plunger 25 carries the movable die 12 toward the fixed die 11 to close the dies and form the mold cavity 18. When the movable die 12 is closed as in FIG. 5, and the mold cavity 18 formed, the pivotal connections between the plunger 25, the link 24 and the spring loaded crank lever 23 remain locked in horizontal alignment until the cam follower 19 is again acted upon to retract the plunger 25.

The wheel 10 continues to rotate counter-clockwise carrying the closed dies from the molding station 17. Near the 11:00 position, a burping station 27 has been employed to open and close the dies very quickly to allow the release of air which had been trapped during closing. The necessity of burping the mold cavity 18 at the burping station 27 is dictated by the desired shape for the molded article. The greater the dimension of the molded article in the axial direction, the greater the depth of the mold cavity 18 required. An increase in the depth of the mold cavity 18 increases the possibility of trapped air during the molding process thus dictating the burping requirement. The need for a burping station 27 has been eliminated by the present invention.

The closed dies are conductively heated to cure the molded articles during the rotation of the wheel through the major arc of one revolution. Conduction to the mold cavity 18 takes place by delivering steam through ducts 29 which lead to annular chambers 30 located within the wheel 10.

After an excursion of almost a full revolution, the closed dies arrive at a stripping station 32 which is located near 12:30 on the rotatable wheel 10. There, each of the axially movable dies 12 is withdrawn from a fixed die 11 to open the dies and allow ejection of the molded article. Ejected articles fall into a chute 33, shown in FIG. 1, which directs them away from the molding machine for collection. Opening is accomplished by engagement of the cam follower 19 to carry the yoke 22 in a direction away from the fixed die 11, thus acting upon the spring loaded crank lever 23 to pull the plunger 25 and withdraw the movable die 12 to the open die position.

At the stripping station 32, the ejection of molded articles is aided by a short burst of air from within the fixed die 11. This short burst of air is introduced into the mold cavity 18 through a die passage 35 which extends from the inside of each fixed die 11 to the peripheral surface 36 of the wheel 10.

Another embodiment of the continuous molding machine provides for ejection of molded articles from the movable die 12 side of the wheel 10. This is accomplished by a burst of air through a die passage 35 extending from the inside of each movable die 12 to the peripheral surface 36 of the wheel 10. The shape of the part will determine when it is necessary to eject from the movable die 12 side as opposed to the fixed die 11 side. These die passages 35 can be seen in FIGS. 2-5.

To provide the burst of air, a nozzle 40 is fixedly mounted adjacent the stripping station 32 and slidable on the peripheral surface 36 of the wheel. This nozzle 40 communicates with the die passages 35 during rotation. As the 10 wheel rotates through the stripping station 32, compressed air is applied to this nozzle 40 to provide the short burst of air for ejecting the molded article.

Nozzles 40 are mounted upon a universal arm 42 that is located near the 12:30 position as shown in FIG. 1. This universal arm 42 extends above the stripping station 32 in an axial direction from the mounting bracket 21 that is located on the movable die side of the wheel.

To aid in the ejection of a molded article, a spring loaded stripping pin 46 may be associated with each of the fixed dies 11. Actuation of the spring loaded stripping pin 46 drives a core 47 of the fixed die 11 toward the movable die 12 to eject the molded article. The string loaded stripping pin 46 is driven by a cam 48 which is mounted to or protruding from the universal arm 42 at the stripping station 32 as shown in FIG. 2.

The improvement of this invention comprises the removal of air from the dies during closing. To this end, an evacuating shoe 50 is fixedly mounted on another universal arm 51 which extends above the molding station 17 in an axial direction from the mounting bracket 21. The peripheral surface 36 of the wheel 10 is in slidable communication with the evacuating shoe 50 to allow application of vacuum to the die passages 35 during rotation. A vacuum pump 52 for applying vacuum to the evacuating shoe 50 is mounted to or hung from the universal arm 51 as shown in FIG. 3.

Figure 3:
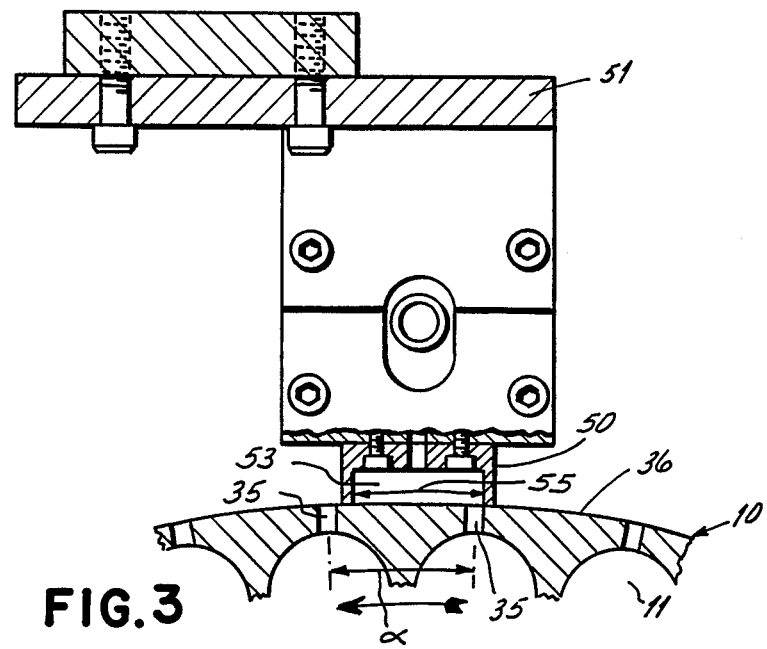
FIG. 3 is a cross sectional view taken along lines 3—3 of FIG. 2.

The evacuating shoe 50 has an arcuate chamber 53 which spans an arc 55 that is equal to the arc between two adjacent die passages 35 as shown in FIG. 3. The shoe 50 is located at the 11:30 die closing position. The cam track 20, which closes the dies, is configurated to effect the closing as the dies move a circumferential distance about equal to the arc between two adjacent dies. Thus, there is an application of constant vacuum to the arcuate chamber 53 to remove air from each die passage 35 during the time when its associated die is closing upon the uncured material to mold a part. Thus, air is removed from the dies during closing to provide for continuous molding of articles with an assurance of no trapped air.

More particularly, with respect to the cam track 20 that initiates due closing, the evacuating shoe 50 is fixedly mounted in a position to begin evacuating the dies after contact with the strip of uncured material 13 as shown in FIG. 2. To accomplish this, the cam track 20 causes the cam follower 19 to move the movable die toward closed slightly before the movable die 12 arrives at the molding station 17. When the movable die 12 does arrive at the molding station 17, and the plunger 25 has already carried the movable die 12 through most of the closing stroke, the associated die passage 35 moves within the arcuate chamber 53 as shown in FIG. 3 to begin the evacuation process.

As air is continuously removed from the die passage 35 during closing, the uncured material flows in an axial direction to partially fill the mold cavity 18 as shown in FIG. 4. The wheel 10 continues to rotate as the dies close completely upon the compound as shown in FIG. 5.

Shortly after the dies have closed to form the mold cavity 18, the associated die passage 35 passes beyond the evacuating shoe 50. As one die passage 35 passes beyond the evacuating shoe 50 with dies in the closed position, the following, adjacent die passage 35 moves within the evacuating shoe 50 with its associated dies in a position as shown in FIG. 2. This process continues as the wheel 10 rotates. Thus, evacuation of air from the die passages 35 is continuous as the associated dies are carried through the molding station 17.

The removal of air from the inside of the mold cavity 18 to the evacuating shoe 50 is accomplished by providing an unlapped finish to the inside walls 58 of the dies. This unlapped finish allows air to pass from the mold cavity 18 to the die passage 35 by flowing between the inside walls 58 of the die and the seat 59 of each die core 47 when vacuum is applied to the evacuating shoe 50.

On the movable die 12 side of the wheel 10, each movable die 12 is withdrawn from the fixed die 11 at the stripping station 32 prior to being carried to the molding station 17. Air may not be removed from the movable die 12 when in the withdrawn position because the plunger 25 blocks communication between the die passage 35 and the mold cavity 18. In order to allow air to be removed from the movable die 12, a plunger cavity 37 that communicates with the mold cavity 18 must become aligned with the die passage 35.

Alignment of the plunger cavity 37 with the die passage 35 first occurs when the movable die 12 has been carried axially by the plunger 25 toward the fixed die 11 and upon the strip of uncured material 13 as shown in FIG. 2. Air is first removed at this point, with the dies partially closed upon the strip of uncured material 13 and most of the closing stroke of the movable die 12 completed. The movable die 12 travels a maximum distance of two and 9/32 inches during the closing stroke.

Air is removed during closing until the mold cavity 18 is completely formed as shown in FIG. 5. Shortly thereafter, when the wheel 10 has rotated the next pair of dies to the position shown in FIG. 2, alignment occurs for the next die passage 35 and plunger cavity 37 associated with the next movable die 12 and air is removed. The evacuating shoe 50 remains aligned with the die passage 35 from the time that the movable die 12 closes from a position shown in FIG. 2 until shortly after it arrives at the completely closed position shown in FIG. 5.

FIG. 2 shows an embodiment of this invention where two identical evacuating shoes 50 are mounted to remove air from the die passages 35 of both the fixed dies 11 and the movable dies 12 during the molding process. This simultaneous removal of air from both dies further reduces the occurrence of trapped air within the mold cavity 18.

Other modifications and embodiments will be readily apparent from the foregoing and from the drawings within departing from the scope of the invention if applicant intends to be bound only by the claims appended hereto.

What is claimed is:

1. Apparatus for molding articles out of uncured vulcanized material comprising:
   a rotatable wheel having a peripheral surface;
   a plurality of fixed dies carried within said peripheral surface of said rotatable wheel;
   a plurality of axially movable dies carried within said peripheral surface of said rotatable wheel, each of said axially movable dies aligned with a fixed die to form a pair of molding dies;
   means for rotating said wheel to a molding station;
   means for moving a strip of uncured material between each pair of said molding dies at said molding station;
   means for closing said molding dies about said strip of uncured material to form a mold cavity for forming molded articles;
   a shoe, fixedly mounted and located adjacent the station where said molding dies close, and slidable with respect to said peripheral surface as said wheel rotates;
   means for applying a vacuum to said shoe, each of said fixed dies having a passage leading to said peripheral surface, each of said passages being in the path of and in communication with said slidable shoe as said wheel rotates through said molding station.

2. An apparatus as in claim 1 in which said fixed dies are uniformly spaced within said peripheral surface on centers spaced α degrees apart;
   said shoe having an arcuate chamber communicating with said peripheral surface, said arcuate chamber spanning α degrees whereby said shoe always communicates with one and only one of said passages as said wheel rotates.

3. An apparatus as in claim 1 in which each of said axially movable dies has a passage leading to said peripheral surface;
   a second shoe fixedly mounted and located adjacent the station where said molding dies close, and slidable with respect to said peripheral surface as said wheel rotates;
   means for applying a vacuum to said second shoe, each of said axially movable dies having a passage leading to said peripheral surface, each of said axially movable die passages being in the path of and in communication with said slidable shoe as said wheel rotates through said molding station thereby to provide removal of air from said fixed dies and from said axially movable dies during die closing.

* * * * *